(12) United States Patent
Kuroda et al.

(10) Patent No.: US 9,469,311 B2
(45) Date of Patent: Oct. 18, 2016

(54) ROLLING STOCK

(75) Inventors: Masaru Kuroda, Nagoya (JP); Koji Nakao, Nagoya (JP)

(73) Assignee: Nippon Sharyo, Ltd., Nagoya-shi (JP)

( * ) Notice: Subject to any disclaimer, the term of this patent is extended or adjusted under 35 U.S.C. 154(b) by 128 days.

(21) Appl. No.: 14/390,173

(22) PCT Filed: Apr. 5, 2012

(86) PCT No.: PCT/JP2012/059317
§ 371 (c)(1),
(2), (4) Date: Oct. 2, 2014

(87) PCT Pub. No.: WO2013/150628
PCT Pub. Date: Oct. 10, 2013

(65) Prior Publication Data
US 2015/0329124 A1     Nov. 19, 2015

(51) Int. Cl.
*B61D 17/00* (2006.01)
*B61D 17/08* (2006.01)

(52) U.S. Cl.
CPC ..................... *B61D 17/08* (2013.01)

(58) Field of Classification Search
CPC ................................ B61D 17/00; B61D 17/08
See application file for complete search history.

(56) References Cited

U.S. PATENT DOCUMENTS

| 2,657,645 | A | * | 11/1953 | Ecoff | B61D 17/18 105/401 |
| 3,631,817 | A | * | 1/1972 | O'Neill | B61D 17/08 105/401 |
| 4,337,708 | A | * | 7/1982 | Peterson | B23K 9/0256 105/397 |
| 4,794,972 | A | * | 1/1989 | Hormann | E06B 3/485 160/236 |
| 5,303,658 | A | * | 4/1994 | Kohira | B61D 17/04 105/400 |
| 5,555,699 | A | * | 9/1996 | Borthick | B62D 25/2054 403/237 |
| 7,500,714 | B2 | * | 3/2009 | Abe | B62D 21/157 296/187.09 |
| 7,854,472 | B2 | * | 12/2010 | Gomi | B62D 25/20 296/193.07 |
| 8,689,702 | B2 | | 4/2014 | Ishizuka et al. | |
| 2009/0108633 | A1 | * | 4/2009 | Ohi | B62D 25/2036 296/204 |
| 2010/0078966 | A1 | * | 4/2010 | Onoda | B62D 25/2036 296/193.07 |

(Continued)

FOREIGN PATENT DOCUMENTS

| JP | 58-104763 U | 7/1983 |
| JP | 61-43574 U | 3/1986 |

(Continued)

OTHER PUBLICATIONS

International Search Report mailed Jul. 10, 2012, issued for PCT/JP2012/059317.

(Continued)

*Primary Examiner* — Jason C Smith
(74) *Attorney, Agent, or Firm* — Locke Lord LLP

(57) ABSTRACT

Provided is a rolling stock having a car body formed by joining side structures to an underframe, end structures, and a roof structure, the side structures having lower portions inclined toward an inside of the car body, the rolling stock having a structure allowing lower end portions of side posts of the side structures and side beams of the underframe to be securely joined. Side beams 21 in an underframe 20 of a rolling stock and lower end portions of side posts 31 having lower portions inclined toward an inside of a car body are joined by means of joint members 71. Each joint member 71 has a side-beam fixation plate portion fixed to an outer face of the side beam and a side-post fixation plate portion fixed to a side face of a lower end portion of the side post.

4 Claims, 7 Drawing Sheets

(56) References Cited

U.S. PATENT DOCUMENTS

| | | | |
|---|---|---|---|
| 2010/0264884 A1* | 10/2010 | Fourmy | H02P 9/08 322/23 |
| 2012/0042805 A1* | 2/2012 | Umebayashi | B29C 70/088 105/396 |
| 2013/0104770 A1* | 5/2013 | Nakao | B61D 15/06 105/392.5 |
| 2013/0125782 A1* | 5/2013 | Ishizuka | B61D 15/06 105/392.5 |
| 2015/0090152 A1* | 4/2015 | Hirashima | B61D 17/08 105/396 |
| 2015/0291185 A1* | 10/2015 | Hirashima | B61D 17/08 105/418 |

FOREIGN PATENT DOCUMENTS

| | | |
|---|---|---|
| JP | 62-74758 A | 4/1987 |
| JP | 03-220058 A | 9/1991 |
| JP | 2007-118690 A | 5/2007 |
| JP | 2007-153106 A | 6/2007 |
| JP | 2007-168546 A | 7/2007 |
| WO | WO-2011/142206 A1 | 11/2011 |

OTHER PUBLICATIONS

Office Action mailed Jun. 23, 2015, issued for the Japanese patent application No. 2014-508965 and English translation thereof.

\* cited by examiner

ROLLING STOCK

TECHNICAL FIELD

The present invention relates to a rolling stock, and relates specifically to a construction of a rolling stock having a car body formed by joining side structures to an underframe, end structures, and a roof structure, the side structures each having a lower-side narrowed shape in which lower portions are inclined to inner sides of the car body.

BACKGROUND ART

A car body of a rolling stock is formed by joining side structures and end structures (including a cab end structure) to four side portions of an underframe, then joining a roof structure to upper portions of the side structures and the end structures, and attaching outside plates, floor plates, interior decorative members, doors, windows, and the like to the structures. In addition, in the rolling stock, a passenger compartment is protected by reinforcing the end structures and the underframe portions or by providing impact absorbing members, as collision countermeasures.

Meanwhile, in recent rolling stocks, the car body width is increased by fully utilizing the rolling stock gauge. In many of such rolling stocks, since a lower portion of the car body comes close to a platform or the like, the car body width of the lower portion is set smaller than the upper portion of the car body. For this reason, the rolling stock having an increased car body width employs a so-called lower-side narrowed structure in which lower portions of the side structures are inclined to inner sides of the car body. In this structure, the lower end portions of side posts inclined to the inner sides of the car body do not intersect at right angles with side beams of the underframe in some cases, depending on the conditions of the rolling stock gauge, leading to a problem in the joint strength between the lower end portions of the side posts and the side beams.

As a joint structure between an underframe and side structures in a car body having such a lower-side narrowed structure as described above, one in which rocker rails joined to hem portions of side plates are joined to outer faces of side beams of the underframe is known (see for example Patent Document 1).

PRIOR ART DOCUMENT

Patent Document

Patent Document 1 Japanese Patent Application Publication No. 2007-168546

SUMMARY OF THE INVENTION

Problem to be Solved by the Invention

In the structure described in Patent Document 1, however, the side posts constituting the side structures are joined in a state where the lower end faces of the side posts are cut in the horizontal direction and abutted on the upper faces of the rocker rails. For this reason, in some cases if the lower end of the side post is displaced off the rocker rail by application of a large external force to the side structure from the side of the car body due to collision or the like, the side structure is largely deformed or damaged, and thus the passenger compartment cannot be sufficiently protected.

In addition, it is conceivable to bend the side posts such that inner faces of lower end portions of the side posts are directed in the vertical direction, and to perform joining with the inner faces of the lower end portions of the side posts being brought into contact with outer faces of the side beams. However, since the lower end portions of the side posts, whose lower portions from the middle portions have been bent to the inside of the car body in conformity with the lower-side narrowed shape, need to be bent in the opposite direction, not only is the number of processes increased, but also it becomes difficult to secure the processing accuracy.

In view of this, an object of the present invention is to provide a rolling stock having a structure allowing side posts of side structures, whose lower portions are inclined toward an inside of a car body, and side beams of an underframe to be securely joined.

Means for Solving the Problem

To achieve the above-described object, a rolling stock of the present invention is a rolling stock having a car body formed by joining side structures to an underframe, end structures, and a roof structure, the side structures including side posts having lower portions inclined toward an inside of the car body, in which side beams in the underframe and lower end portions of the side posts are joined by means of joint members, each of the side beams has a Z-shaped cross-sectional shape constituted of: a base plate portion disposed in a vertical direction; a side-beam lower projecting piece projecting from a lower end portion of the base plate portion toward an outside of the car body; and a side-beam upper projecting piece projecting from an upper end portion of the base plate portion toward the inside of the car body, and each of the joint members has a side-beam fixation plate portion fixed to an outer face of the base plate portion in parallel therewith and a side-post fixation plate portion fixed to a side face of a lower end portion of the side post.

Moreover, in the rolling stock of the present invention, each of the joint members has a pair of side-post fixation plate portions bent in a direction along opposite side faces of the lower end portion of the side post from opposite edges of the side-beam fixation plate portion in a car-body front-rear direction and fixed respectively to the opposite side faces of the lower end portion of the side post. In addition, the rolling stock further includes: a side-beam upper joint member joining an upper face of each side-beam upper projecting piece and a lower portion of an inner face of the corresponding side post. Furthermore, the rolling stock further includes: a side-beam lower joint member joining each side-beam lower projecting piece and a lower end portion of an outer face of the corresponding side post.

Effect of the Invention

According to the rolling stock of the present invention, the lower end portions of the side posts of the side structures are joined to the outer faces of the side beams of the underframe by means of the joint members. Accordingly, it is possible to transmit an external force applied to the side structures from the sides of the car body to the side beams from the lower end portions of the side posts via the joint members, and to thus securely support the lower end portions of the side posts with the side beams of the underframe. Therefore, it is possible to suppress deformation of the side structures toward the inside of the car body. Moreover, joining the upper face of each side beam and the lower portion of the inner face of the corresponding side post by means of the side-beam upper joint member makes it possible to enhance the joint strength between the side beams and the side posts. Furthermore, joining the projecting piece, which projects from the lower portion of each side beam, and the lower end portion of the outer face of the corresponding side post by means of the side-beam lower joint member makes it possible to enhance the joint strength between the side beams and the side posts, and also to enable an external force applied to the side posts from above the car body to be supported with the side beams.

MODES FOR CARRYING OUT THE INVENTION

Figure 1:
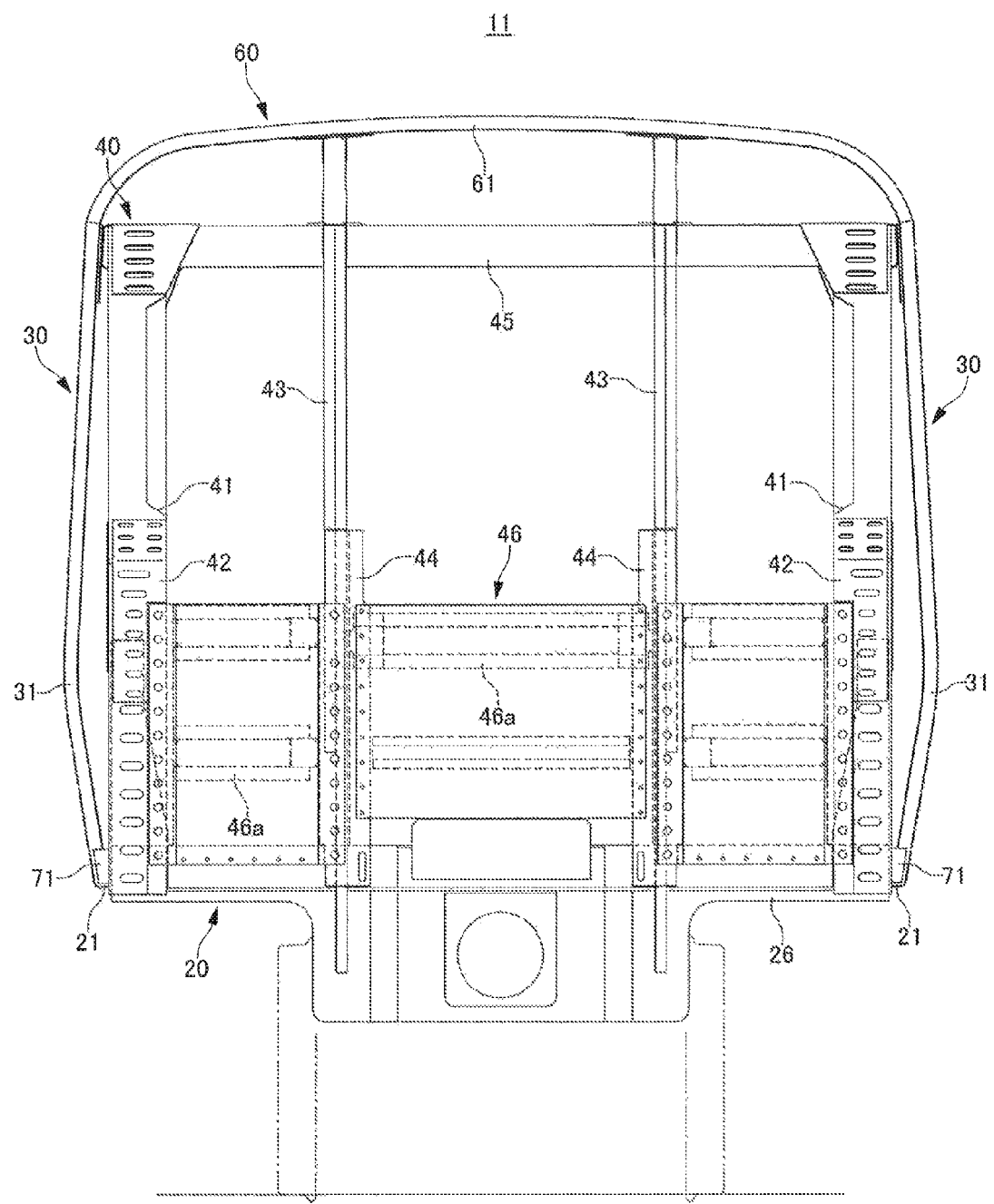
FIG. 1 is a front view of a rolling stock structure showing an embodiment of a rolling stock of the present invention.
Figure 2:
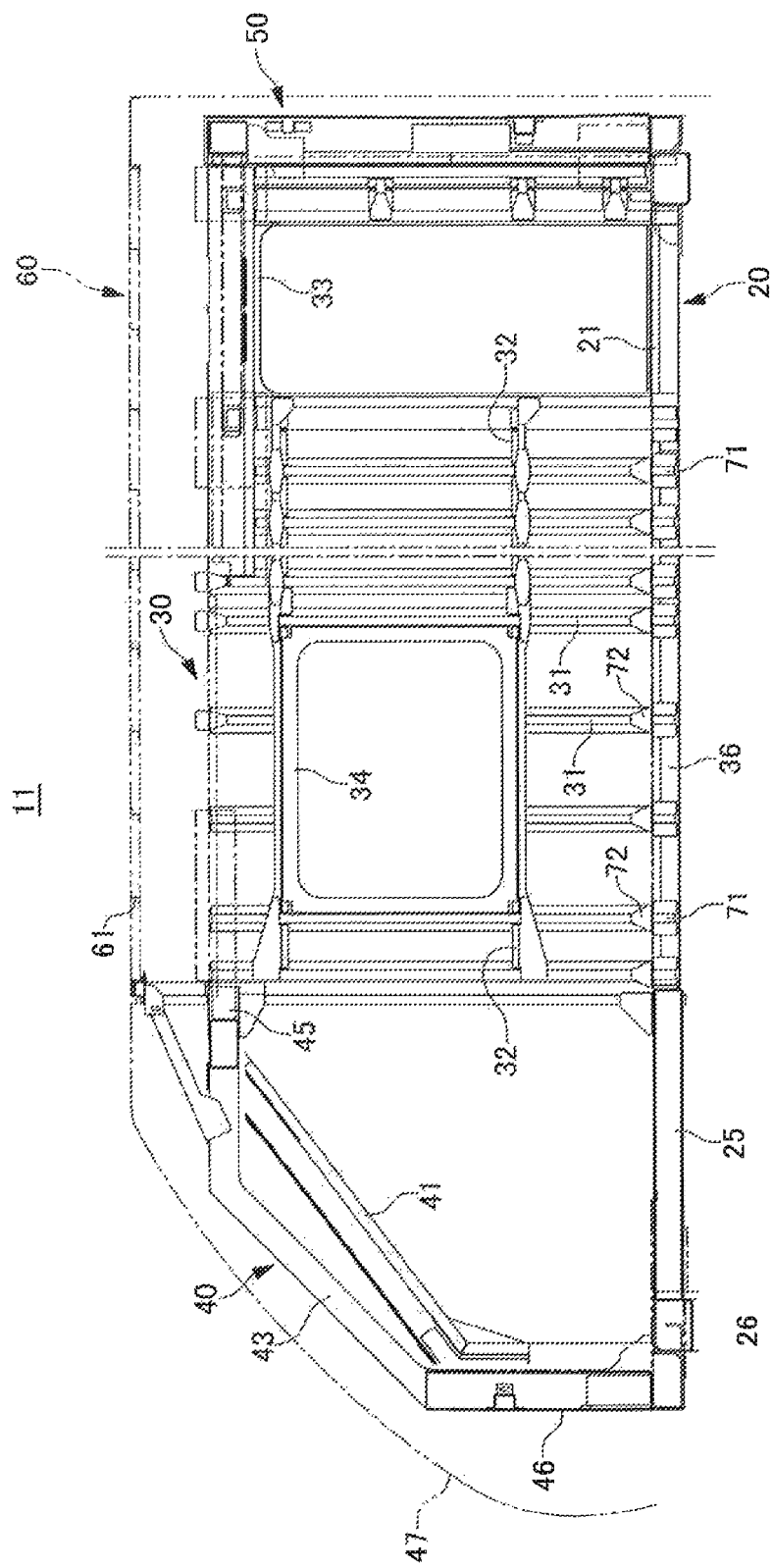
FIG. 2 is a side view of a side structure showing the same.
Figure 3:
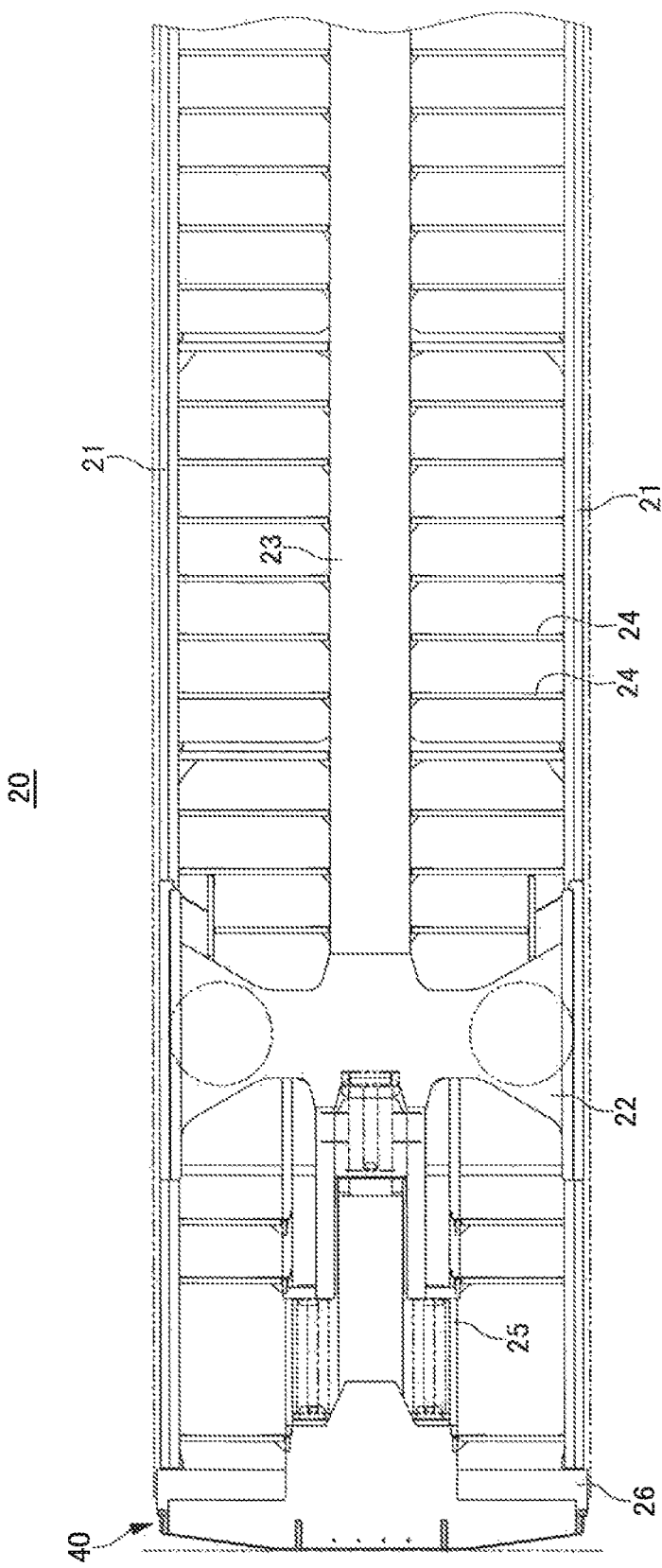
FIG. 3 is a plan view of an underframe showing the same.
Figure 4:
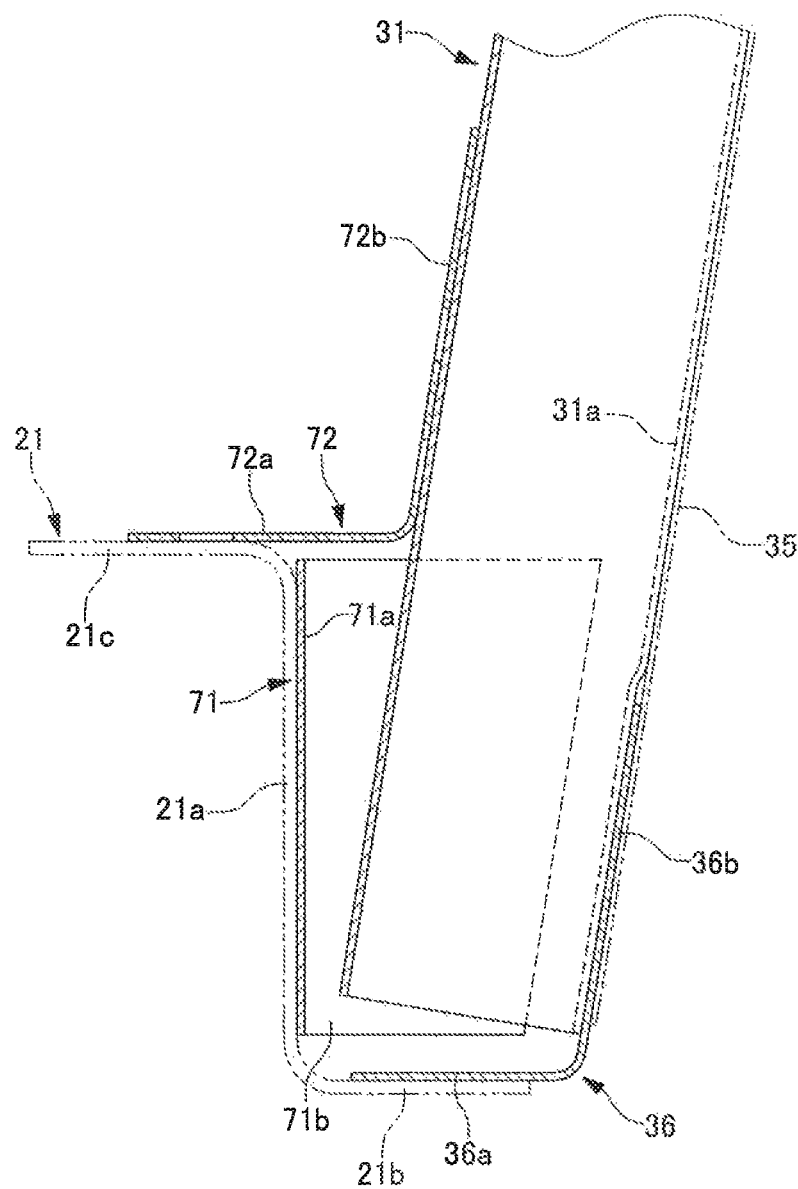
FIG. 4 is a cross-sectional view taken along the line IV-IV in FIG. 6.
Figure 5:
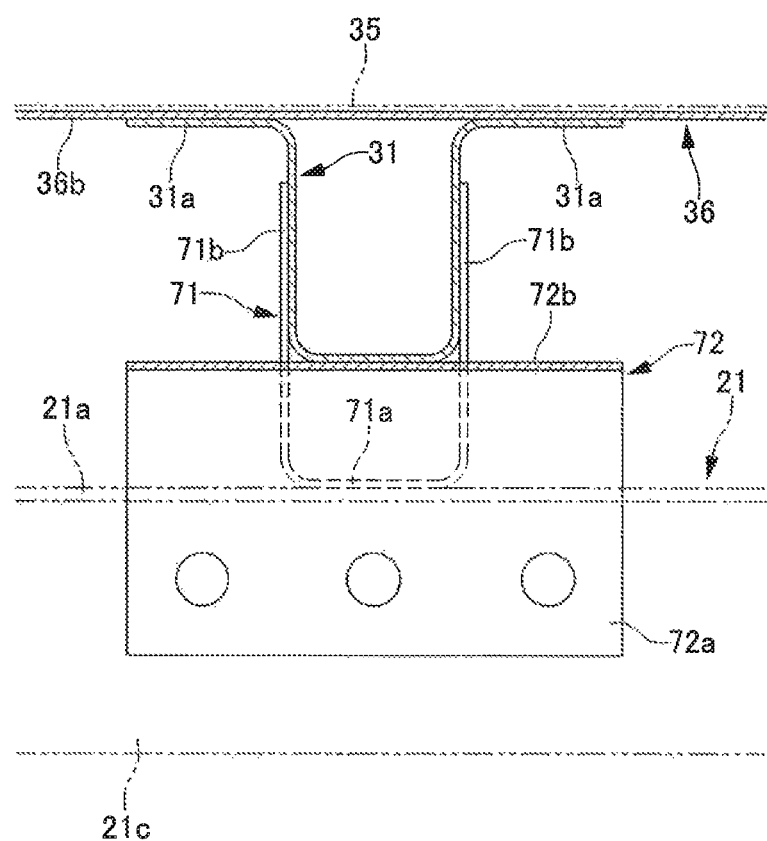
FIG. 5 is cross-sectional view taken along the line V-V in FIG. 6.
Figure 6:
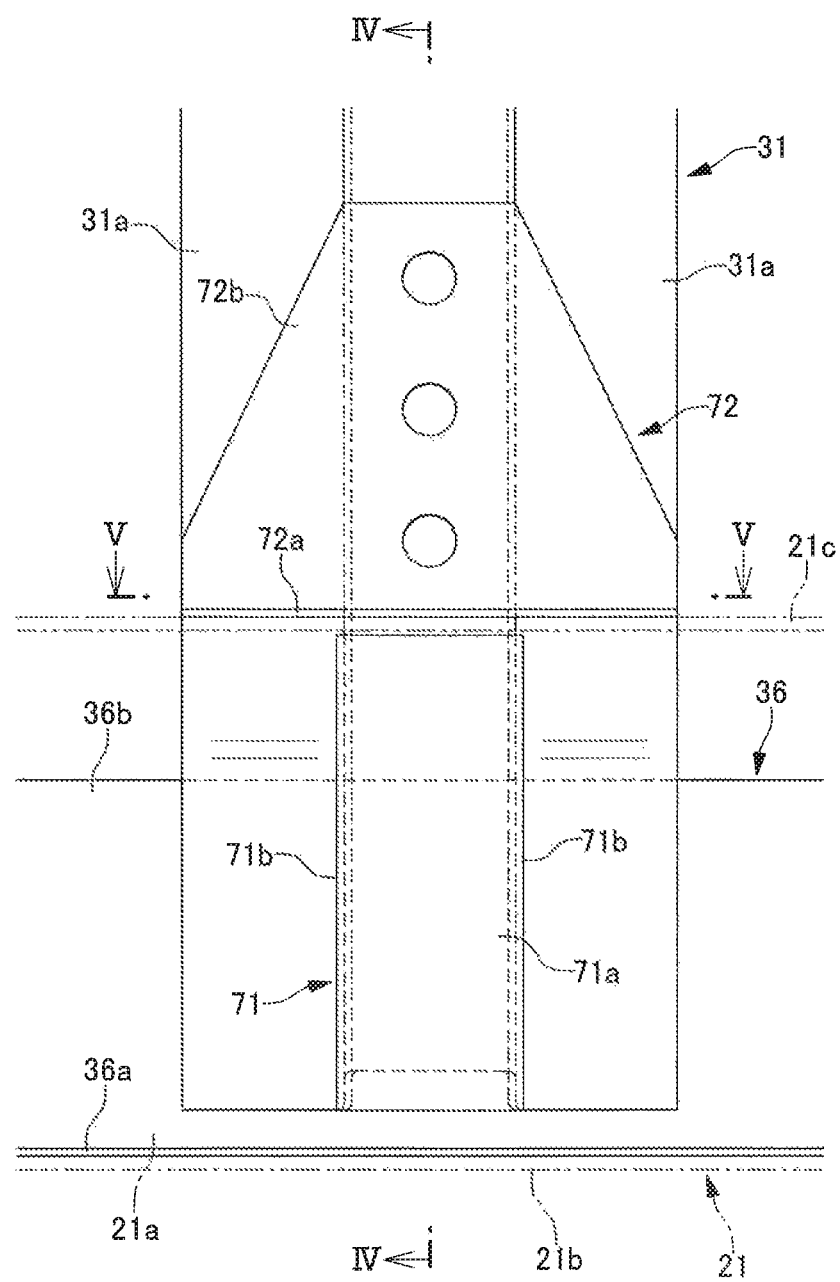
FIG. 6 is a main-part side view showing a joint portion between a side beam of the underframe and a side post of the side structure.

A car body 11 of a rolling stock shown in the embodiment includes: an underframe 20; a pair of left and right side structures 30 provided on the opposite sides of the underframe 20; a cab end structure 40 and an end structure 50 provided respectively to the opposite ends of the underframe 20 and the side structures 30; and a roof structure 60 provided to cover upper portions of the side structures 30, the cab end structure 40, and the end structure 50. The car body 11 has a lower-side narrowed structure in which the lower portions of the car body is formed narrower than the upper portions of the car body in such a manner as to conform to a pre-set rolling stock gauge.

The underframe 20 includes: a pair of left and right side beams 21 disposed in a rail direction; a pair of front and rear bolster beams 22 disposed in a railroad-tie direction near the front and rear end portions; a center beam 23 coupling the front and rear bolster beams 22 in the rail direction; a plurality of cross beams 24 coupling the side beams 21 and the center beam 23 in the railroad-tie direction; an impact absorbing part 25 provided on the car-body front end side of the bolster beam 22; and an end beam 26 provided on a front end of the impact absorbing part 25.

Each of the side beams 21 is a member with a Z-shaped cross-sectional shape. The side beam 21 has a lower projecting piece 21b projecting in a horizontal direction toward the outer side of the car body from a lower end portion of a base plate portion 21a disposed in a vertical direction, and also has an upper projecting piece 21c projecting in the horizontal direction toward the inside of the car body from an upper end portion of the base plate portion 21a and disposed to cover an upper face end portion of the cross beams 24.

The side structures 30 include: a plurality of side posts 31 extending in the vertical direction; a plurality of frame members 32 extending in a car-body front-rear direction; door frame parts 33 forming gate opening portions; and window frame parts 34 forming side-window opening portions. Each of the side posts 31 is bent into a shape such that a lower portion from a middle portion thereof in the up-down direction is inclined toward the inside of the car body so as to conform to the lower-side narrowed structure. Each side post 31 is formed of a member having a hat-shaped cross-section in a horizontal cross-sectional shape. The lower end portion of each side post 31 is joined to the side beam 21 via a rocker rail 36, a joint member 71, and a side-beam upper joint member 72. Outside plates 35 are joined to outer faces of both flanges 31a of the side posts 31.

The rocker rail 36 is formed of an elongated member having a substantially L-shaped cross-section in a vertical cross-sectional shape. The rocker rail 36 has: a side-beam lower fixation plate portion 36a extending in the horizontal direction and fixed to an upper face of the lower projecting piece 21b of the side beam 21; and a side-structure lower fixation plate portion 36b standing upright from a car-body outer end of the side-beam lower fixation plate portion 36a in conformity with an inclination of the lower end portion of the side post 31. The side-structure lower fixation plate portion 36b is fixed in a state of being sandwiched between the outside plate 35 and the side post 31 in which an outer face of the lower end portion is offset toward the inside of the car body with the rocker rail 36 being integrally attached in the longitudinal direction of the side structure 30.

The cab end structure 40 is an end structure provided with a driver's cabin and having an outer shape formed in a streamlined shape. The cab end structure 40 includes: a pair of corner posts 41 and corner-post reinforcement members 42 provided respectively on the opposite end portions of the end beam 26 in the width direction; a pair of end posts 43 and end post reinforcement members 44 provided respectively on the inner sides of the corner posts 41; and an upper reinforcement beam 45 connecting upper end portions of the corner posts 41 and the end posts 43 in the horizontal direction. Front face reinforcement members 46 each having a cross frame 46a extending in the horizontal direction are provided between each corner post 41 and the corresponding end post 43 as well as between the end posts 43. The cab end structure 40 is covered with an outside plate 47 formed in a streamlined shape, and a front window is provided in a portion above the front face reinforcement panels 46. On the other hand, the end structure 50 is formed in a flat-plate shape, and has a gangway opening portion (not shown) provided in a center portion in the width direction.

The roof structure 60 is formed of: a pair of long girders disposed respectively on the opposite sides in the rail direction; a plurality of rafters 61 extending in the railroad-tie direction, which are joined orthogonally to the long girders; and a roof board joined on the outer sides of the rafters. The long girders are joined to the upper end portions of the side structures 30 and the rafters on the front and rear ends are joined respectively to the upper end portion of the cab end structure 40 and the upper end portion of the end structure 50.

In this way, when the side structures 30 having the side posts 31 in which the lower portion is inclined toward the inside of the car body is joined to the underframe 20, the cab end structure 40, the end structure 50, and the roof structure 60 to form the car body, the lower end portion of each side post 31 is joined to the side beam 21 via the rocker rail 36, the joint member 71, and the side-beam upper joint member 72, as described above.

The joint member 71 has: a side-beam outer face fixation plate portion 71a fixed to an outer face of the base plate portion 21a of the side beam 21; and a pair of side-post side face fixation plate portions 71b projecting outward respectively from the opposite side ends of the side-beam outer face fixation plate portion 71a in the car-body front-rear direction, and formed in conformity with the opposite side faces of the lower end portion of the side post 31 in the car-body front-rear direction. In the car body attached state, the joint member 71 is brought into a state where the side-beam outer face fixation plate portion 71a faces in the vertical direction and the joint member 71 has a U shape in the plan view. The joint member 71 is attached integrally to the lower end portion of each side post 31 on the inside of the car body by welding the joint member 71 with the side post 31 being sandwiched between the pair of side-post side face fixation plate portions 71b.

The side-beam upper joint member 72 has: a side-beam upper face fixation plate portion 72a fixed to an upper face of the upper projecting piece 21c of the side beam 21; and a side-post inner face fixation plate portion 72b standing upright from a car-body outer end of the side-beam upper face fixation plate portion 72a in conformity with an inclination of the lower end portion of the side post 31. The side-beam upper face fixation plate portion 72a has a larger width in the car-body front-rear direction than the width of the side post 31 in the car-body front-rear direction. The side-post inner face fixation plate portion 72b is formed in a triangular shape having an upper end portion substantially coincide with the width of the side post 31 in the car-body front-rear direction.

The side-beam lower fixation plate portion 36a of the rocker rail 36 attached to the side structure 30 is in parallel with the lower projecting piece 21b of the side beam 21, and the side-beam lower fixation plate portion 36a is brought into contact with the upper face of the lower projecting piece 21b, and there are welded together. The side-beam outer face fixation plate portion 71a of the joint member 71 attached to the side post 31 is in parallel with the base plate portion 21a of the side beam 21, and the side-beam outer face fixation plate portion 71a is brought into contact with the outer face of the base plate portion 21a, and these are welded together. In this way, when the joint member 71 and the rocker rail 36 are joined to the side beam 21, the lower end of the side structure 30 and the side edge portion of the underframe 20 are joined integrally by means of the rocker rail 36 and the joint member 71.

Next, the side-beam upper face fixation plate portion 72a of the side-beam upper joint member 72 is brought into contact with the upper face of the upper projecting piece 21c of the side beam 21, and these are welded together, and also the side-post inner face fixation plate portion 72b is brought into contact with the lower portion of the inner face of the side post 31, and these are welded together. In this way, the joint strength between the lower end portion of the side post 31 and the side beam 21 is strengthened by the side-beam upper joint member 72.

In this way, the side posts 31, in each of which the lower portion is inclined toward the inside of the car body in conformity with the lower-side narrowed shape of the car body 11, are joined to the outer faces of the base plate portions 21a, which are the outer faces of the side beams 21, by means of the joint members 71. This makes it possible to securely support an external, force applied from the sides of the car body 11 to the side structures 30 at the outer face portions of the side beams 21 of the underframe 20 through the joint member 71 from the lower end portions of the side posts 31, and to thus suppress deformation of the side structures 30 toward the inside of the car body.

Accordingly, the joint strength between the side posts 31 and the side beams 21 is enhanced as compared to the case where the lower ends of the side posts 31 are joined in a state of being placed on the upper faces of the side beams 21 or the upper faces of the rocker rails. The underframe. 20 and the side structures 30 can thus be joined firmly. Therefore, even when a large external force is applied to the side face portions of the car body 11 from the side, it is possible to suppress deformation of the side structures 30 toward the inside of the car body.

In addition, the joint strength between the side posts 31 and the side beams 21 can be enhanced by joining the upper faces of the upper projecting pieces 21c, which are the upper faces of the side beams 21, and the lower portions of the inner faces of the side posts 31 by means of the side-beam upper joint members 72. The underframe 20 and the side structures 30 can thus be joined more firmly. Moreover, since the lower projecting pieces 21b are provided to project in the horizontal direction from the lower end portions of the side beams 21 toward the outside of the car body, and the rocker rails 36, which are provided in the lower end portions of the side structures 30, are joined in the state of being placed on the upper faces of the lower projecting pieces 21b, the rocker rails 36 serve also as side-beam lower joint members for joining the lower end portions of the outer faces of the side posts 31 and the lower projecting pieces 21b of the side beams 21. This makes it possible to also support an external force applied from above the car body 11 to the roof structure 60 at the lower projecting pieces 21b of the side beams 21 through the side posts 31, and to thus suppress deformation of the roof structure 60 toward the inside of the car body due to an external force from above.

Figure 7:
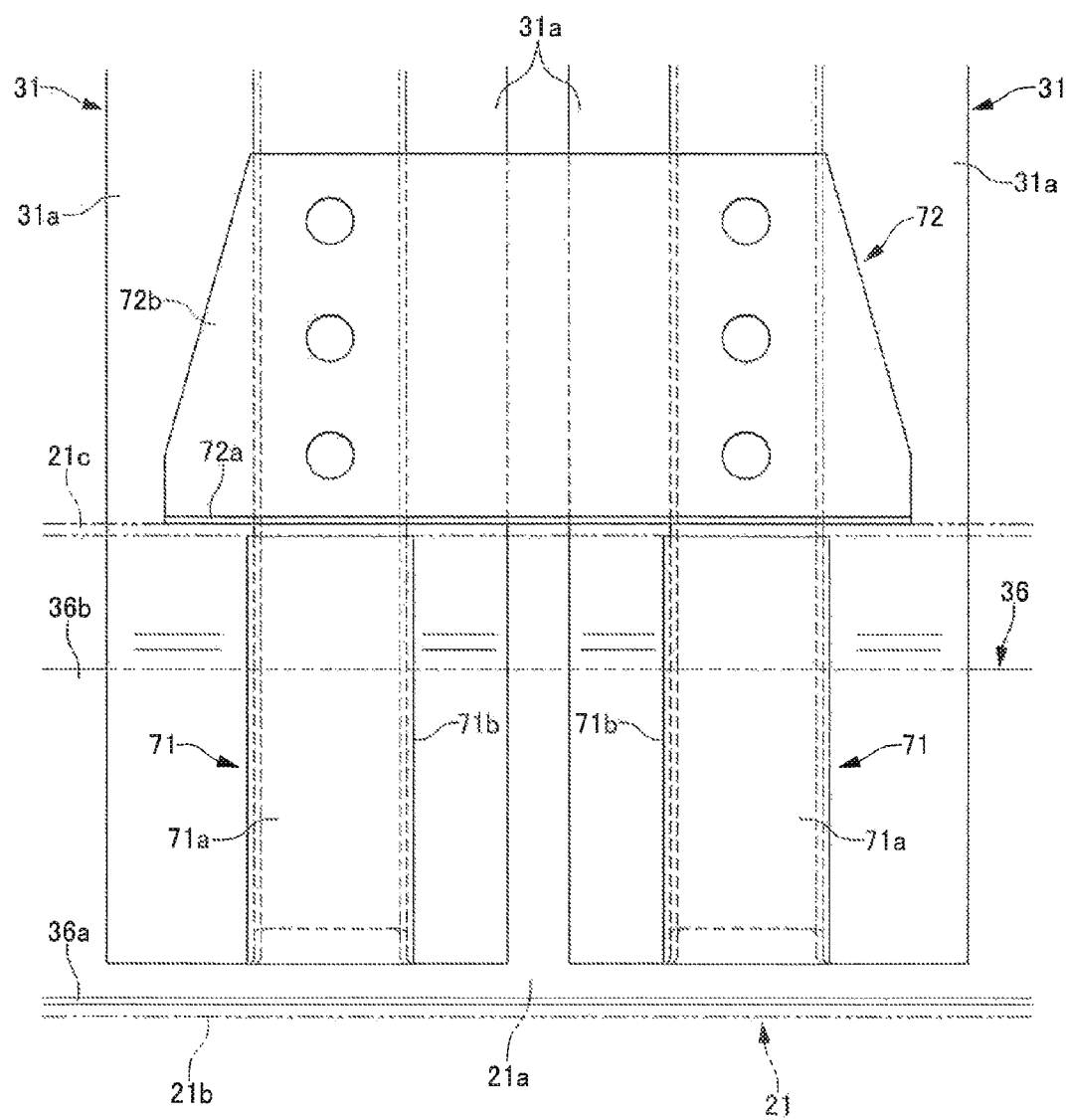
FIG. 7 is a main-part side view showing another exemplary form of a joint portion between the side beam and the side post.

In addition, it is possible to change the shapes of the joint members 71 and the side-beam upper joint members 72 as appropriate depending on the positions of the side posts 31 and the conditions of the side beams 21 on the inside of the car body. For example, as shown in FIG. 7, when two side posts 31 are disposed close to each other, it is possible to use one having a larger width in the car-body front-rear direction as the side-beam upper joint member 72 and to weld and integrally join the inner faces of the two side posts 31 adjacent to each other by means of the single side-post inner face fixation plate portion 72b. Moreover, it is also possible to form the joint member 71 into an L-shape in the plan view in the car body attached state, and to dispose two joint members 71 on each of the faces of the side post 31 in the front and rear sides of the car body in a sandwiching manner, and to join the lower end portion of each side post 31 to the outer face of the side beam 21 by means of the two joint members 71. Alternatively, it is also possible to fix an auxiliary plate member having appropriate width and length to the inside of the car body face of the side-beam outer face fixation plate portion 71a of the joint member 71 that is formed in a U-shape as described above, and to fix the auxiliary plate member to the outer face portion of the side beam 21.

Note that although the first rolling stock in which the cab end structure is disposed on one side of the car body has been described as examples in the embodiments, the same structure can be employed for rolling stocks other than the first rolling stock, in which a car body has flat-plate-shaped end structures on the opposite ends, and exterior decoration and interior decoration can be selected as appropriate depending on the purpose and conditions for use of the rolling stock. Moreover, the members have any shapes, and welding portions of the members may be provided with welding holes as necessary.

EXPLANATION OF THE REFERENCE NUMERALS

11 car body
20 underframe
21 side beam
21a base plate portion
21b lower projecting piece
21c upper projecting piece
22 bolster beam
23 center beam
24 cross beam
25 impact absorbing part
26 end beam
30 side structure
31 side post
31a flange
32 frame member
33 door frame part
34 window frame part
35 outside plate
36 rocker rail
36a side-beam lower fixation plate portion
36b side-structure lower fixation plate portion.
40 cab end structure
41 corner post
42 corner-post reinforcement member
43 end post
44 end post reinforcement member
45 upper reinforcement beam
46 front face reinforcement member
46a cross frame
47 outside plate
50 end structure
60 roof structure
61 rafter
71 joint member
71a side-beam outer face fixation plate portion
71b side-post side face fixation plate portion
72 side-beam upper joint member
72a side-beam upper face fixation plate portion
72b side-post inner face fixation plate portion

The invention claimed is:

1. A rolling stock having a car body formed by joining side structures to an underframe, end structures, and a roof structure, the side structures including side posts having lower portions inclined toward an inside of the car body, wherein
   side beams in the underframe and lower end portions of the side posts are joined by means of joint members,
   each of the side beams has a Z-shaped cross-sectional shape constituted of: a base plate portion disposed in a vertical direction; a side-beam lower projecting piece projecting from a lower end portion of the base plate portion toward an outside of the car body; and a side-beam upper projecting piece projecting from an upper end portion of the base plate portion toward the inside of the car body,
   each of the joint members has a side-beam fixation plate portion fixed to an outer face of the base plate portion in parallel therewith and a side-post fixation plate portion fixed to a side face of a lower end portion of the side post, and
   each of the joint members has a pair of side-post fixation plate portions bent in a direction along opposite side faces of the lower end portion of the side post from opposite edges of the side-beam fixation plate portion in a car-body front-rear direction and fixed respectively to the opposite side faces of the lower end portion of the side post.

2. The rolling stock according to claim 1, further comprising:
   a side-beam upper joint member joining an upper face of each side-beam upper projecting piece and a lower portion of an inner face of the corresponding side post.

3. The rolling stock according to claim 1, further comprising:
   a side-beam lower joint member joining each side-beam lower projecting piece and a lower end portion of an outer face of the corresponding side post.

4. The rolling stock according to claim 2, further comprising:
   a side-beam lower joint member joining each side-beam lower projecting piece and a lower end portion of an outer face of the corresponding side post.

* * * * *